UNITED STATES PATENT OFFICE.

FELIX JOHAN TROMP, OF PRETORIA, TRANSVAAL, SOUTH AFRICA.

PROCESS FOR THE MANUFACTURE OF PHOSPHATIC FERTILIZER.

1,372,051.                    Specification of Letters Patent.    Patented Mar. 22, 1921.

No Drawing.        Application filed June 11, 1919. Serial No. 303,427.

*To all whom it may concern:*

Be it known that I, FELIX JOHAN TROMP, a British subject, residing at Transvaal University College, Pretoria, Transvaal Province of the Union of South Africa, have invented certain new and useful Improvements in Processes for the Manufacture of Phosphatic Fertilizer, of which the following is a specification.

This invention has reference to the treatment of phosphatic minerals containing iron and/or aluminium phosphates, for the purpose of rendering the phosphate contents available for plant life.

It is well known to treat such minerals with hydrates and salts of sodium or potassium for the production of water soluble phosphates, and processes have also been proposed to treat them in various ways with lime for the production of citrate soluble phosphate. It is also known to treat the mineral both with hydrates or salts of sodium or potassium and with lime but the processes hitherto proposed in which both these reagents are employed have been costly and effected but a moderate conversion of the phosphate to an assimilable form. The end product moreover contained such a proportion of alkali compounds as to be injurious to many soils.

The present invention consists in a wet process employing caustifiable compounds, an alkali, metal and lime, which enables conversions of 90% and over to be attained industrially. The end product is a citric acid soluble phosphate containing unimportant quantities of water soluble phosphate or other compounds of sodium or potassium.

By the term caustifiable compound of an alkali metal is meant an oxid, hydrate or salt of sodium or of potassium or of both these metals, which in the presence of lime and water generates caustic potash or soda.

I have found that for successful results the following conditions are essential:—

1. The caustifiable compound of the alkali metal must be present only in small quantities. The amount should not exceed 4 parts by weight (reckoned as $Na_2CO_3$) to 20 parts of phosphate (reckoned as $P_2O_5$). I have found that as a rule the best result is obtained when the proportion is about 1 to 20.

2. The proportion of lime (reckoned as CaO) to phosphate (reckoned as $P_2O_5$) must not be less than 30 to 20.

In order to obtain the highest conversion it is further necessary that

3. Caustic and not slaked lime should be used.

4. The lime should be slaked in the presence of the phosphate and the caustifiable compounds, when the proportion of caustifiable compound is low; but when the higher proportions of caustifiable compound are present, it is better to slake the lime beforehand since it does not disintegrate readily in the more concentrated solutions of the caustifiable compound.

5. The treatment should be carried out at an elevated temperature, preferably near the boiling point.

The following is an example of carrying the invention into effect in the treatment of Saldanha Bay phosphate, which is an iron aluminium phosphate containing about 21% of phosphoric oxid; the caustifiable compound used being sodium carbonate.

250 parts by weight of such phosphate suitably comminuted are mixed with 125 parts of water and 2.5 parts of sodium carbonate and heated nearly to the boiling point. 100 parts of powdered quicklime are then added gradually together with sufficient water to keep the mass fairly fluid. The mass is kept in vigorous agitation during the process and about half an hour after the whole of the lime has been added the reaction is completed. The bulk of the water is then removed by evaporation, centrifuging or the like, and the remaining solid is dried. The product is a citric acid soluble phosphate which can be applied directly to the land and which can also successfully be mixed with other fertilizing agents.

I claim:—

1. A process for the manufacture of citric acid soluble phosphates from iron and/or aluminium phosphates, consisting in treating the latter with a caustifiable compound of an alkali metal and lime in the presence of water, said compound not exceeding 4 equivalents reckoned as carbonate to 20 parts of phosphate reckoned as phosphoric pentoxid and the lime being not less than 30 parts reckoned as calcium oxid to 20 parts phosphate reckoned as phosphoric pentoxid.

2. The process as claimed in claim 1, in which quicklime is used.

3. The process as claimed in claim 1 in which the lime is added to a mixture of the phosphate, the compound and water.

4. The process as claimed in claim 1 in which the lime is added (with small quantities at a time) to a mixture of the phosphate, the compound and water.

5. The process as claimed in claim 1 in which the treatment is carried out at an elevated temperature, preferably about boiling point.

In testimony whereof I affix my signature.

FELIX JOHAN TROMP.